(12) United States Patent
Zaugg (10) Patent No.: US 7,954,375 B2
(45) Date of Patent: Jun. 7, 2011

(54) INCLINED AXIS GRAVITY GRADIOMETER

(75) Inventor: Thomas Zaugg, Ypsilanti, MI (US)

(73) Assignee: General Dyamics Advanced Information Systems, Inc., Arlington, VA (US)

( * ) Notice: Subject to any disclaimer, the term of this patent is extended or adjusted under 35 U.S.C. 154(b) by 381 days.

(21) Appl. No.: 12/356,962

(22) Filed: Jan. 21, 2009

(65) Prior Publication Data

US 2010/0180680 A1    Jul. 22, 2010

(51) Int. Cl.
*G01V 7/00*    (2006.01)

(52) U.S. Cl. .................................. 73/382 G; 73/382 R (58) Field of Classification Search ............... 73/382 G, 73/382 R; 33/366.25, 366.11, 366.13, 366.26
See application file for complete search history.

(56) References Cited

U.S. PATENT DOCUMENTS

| | | | | |
|---|---|---|---|---|
| 4,874,942 A * | 10/1989 | Clauser | ........................ | 250/251 |
| 4,992,656 A * | 2/1991 | Clauser | ........................ | 250/251 |
| 5,274,231 A * | 12/1993 | Chu et al. | ........................ | 250/251 |
| 5,274,232 A * | 12/1993 | Chu et al. | ........................ | 250/251 |
| 6,125,698 A * | 10/2000 | Schweitzer et al. | ........ | 73/382 G |
| 6,212,952 B1 * | 4/2001 | Schweitzer et al. | ........ | 73/382 G |
| 6,450,028 B1 * | 9/2002 | Vail, III | ........................ | 73/382 G |
| 2003/0129117 A1 * | 7/2003 | Mills | ........................ | 423/347 |
| 2004/0118348 A1 * | 6/2004 | Mills | ........................ | 118/723 MW |
| 2004/0247522 A1 * | 12/2004 | Mills | ........................ | 423/648.1 |
| 2005/0202173 A1 * | 9/2005 | Mills | ........................ | 427/249.7 |
| 2008/0304522 A1 * | 12/2008 | Mills | ........................ | 372/5 |
| 2009/0068082 A1 * | 3/2009 | Mills | ........................ | 423/347 |
| 2009/0098421 A1 * | 4/2009 | Mills | ........................ | 429/17 |
| 2009/0146083 A1 * | 6/2009 | Mills | ........................ | 250/493.1 |
| 2009/0196801 A1 * | 8/2009 | Mills | ........................ | 422/186 |

FOREIGN PATENT DOCUMENTS

JP        60071959 A  *  4/1985
WO      WO 9505614 A1 *  2/1995

* cited by examiner

*Primary Examiner* — Hezron Williams
*Assistant Examiner* — Samir M Shah
(74) *Attorney, Agent, or Firm* — Hunton & Williams LLP (57) ABSTRACT

Systems for and methods of detecting gravitational acceleration and gravity gradients are disclosed. The systems and methods include gravity gradiometers whose axes are substantially horizontal. In comparison with prior art systems, the systems presently disclosed provide one or both of more accurate measurements for the same amount of space, and smaller space requirements with the same or better accuracy.

21 Claims, 4 Drawing Sheets

INCLINED AXIS GRAVITY GRADIOMETER

FIELD OF THE INVENTION

The present invention generally relates to the field of gravity measurement. More specifically, the present invention relates to a gravity gradiometer with improved sensitivity relative to gradiometer size.

BACKGROUND INFORMATION

A gravity gradiometer measures gradients in a gravitational field, that is, spatial changes in the gravitational field. Such changes may be caused by inhomogeneous subterranean distribution of mass, such as oil, mineral deposits, tunnels or other structures.

Schweitzer et al. describe utility of a gravity gradiometer in the context of secondary oil recovery in U.S. Pat. Nos. 6,125,698 and 6,212,952. The gradiometer includes eight accelerometers mounted about the periphery of a rotor assembly that is rotated about a spin axis. For a gradiometer having its spin axis aligned with the field lines of an ideally uniform gravity field, each accelerometer experiences the same acceleration force as it proceeds along its orbital path. However, where the local gravity field is perturbed by the presence of one or more masses, or the spin axis is tilted relative to the local field lines, each accelerometer may experience different accelerations throughout its orbit. The gradiometer is operated with different orientations of its axis to eliminate undesired effects of horizontal gradients.

Kohel et al. propose a gravity gradiometer for space in "Quantum Gravity Gradiometer Development for Space," Jet Propulsion Laboratory, California Institute of Technology. Specifically, Kohel et al. proposes deploying two vertically-oriented interferometric accelerometers. Each interferometric accelerometer would utilize a magneto-optic trap ("MOT") to hold and trap cold atom clouds using magnetic fields and circularly polarized beams of laser light. A Raman laser beam is directed along the vertical path of the atoms. Each interferometric accelerometer provides a phase reading based on three interactions between the Raman laser beam and the atoms. The gradiometer calculates a gravity gradient from phases determined by the two interferometric accelerometers.

The proposed gravity gradiometer of Kohel et al. has several drawbacks. For example, to provide a reasonable level of accuracy, the height of Kohel et al.'s two interferometric accelerometers would have to be on the order of several meters. A gravity gradiometer of this size presents numerous obstacles in its deployment. Due to its height, the unit could not reasonably be deployed in standard unmanned aerial reconnaissance vehicles. Another drawback is that Kohel et al.'s gravity gradiometer is highly sensitive to acceleration within a horizontal plane. The travel path of the cold atom clouds must remain within the beam width of the Raman laser, which requires that the Raman laser and the atoms remain at substantially the same transverse velocity. Once a cold atom cloud is launched, however, it may move out of the Raman beam if the structure accelerates transversely, destroying the measurement.

SUMMARY OF THE CLAIMED INVENTION

Certain embodiments provide one or more of the following advantages relative to the prior art: heightened sensitivity, reduced size and greater applicability to mobile applications.

A gravity gradiometer that includes two interferometric accelerometers with improved sensitivity is disclosed. Certain embodiments include two interferometric accelerometers having axes slightly inclined from the horizontal plane. The improved sensitivity is achieved, by way of non-limiting example, by confining cold atom clouds using blue-detuned evanescent fields in directions orthogonal to the interferometric accelerometers' axes. The gravitational field freely accelerates the cold atom clouds in the axial direction, while acceleration in the orthogonal directions is constrained (interrupted) by the repulsive evanescent fields. Because the component of the gravitational field operating in the axial direction is a small fraction of the total gravitational field, the time it takes for the atoms to traverse a given distance is much longer than it would be in a gravity gradiometer having vertically-oriented interferometric accelerometers. Because, in some embodiments, gradiometer sensitivity is proportional to the square of the integration time, significant improvements in sensitivity can be achieved relative to prior art gravity gradiometers of comparable size.

BRIEF DESCRIPTION OF THE DRAWINGS

The invention, both as to its structure and operation together with the additional objects and advantages thereof are best understood through the following description of exemplary embodiments of the present invention when read in conjunction with the accompanying drawings.

DETAILED DESCRIPTION OF THE PREFERRED EMBODIMENTS

Figure 1:
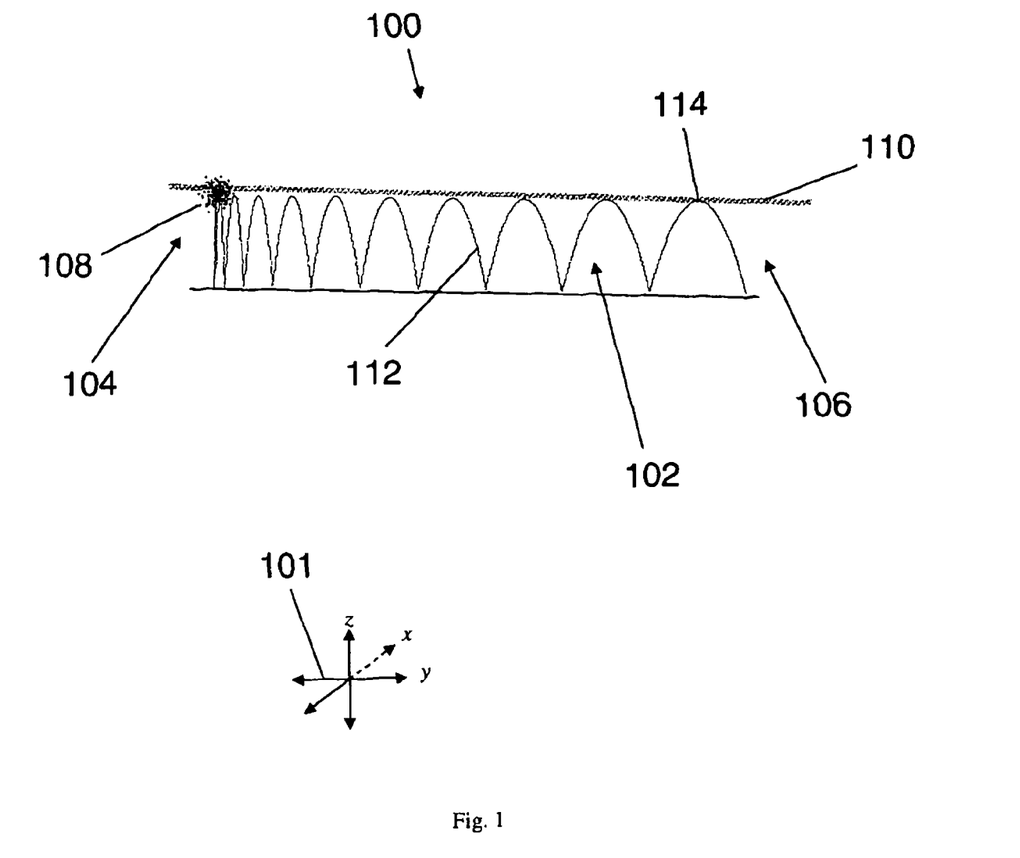
FIG. 1 is a schematic diagram of an interferometric accelerometer according to an embodiment of the present invention.

FIG. 1 is a schematic diagram of an interferometric accelerometer according to an embodiment of the present invention. Unlike in vertical gravity gradiometers of the prior art, interferometric accelerometer 100 is at a slight incline to the horizontal. More particularly, interferometric accelerometer 100 includes a trough 102 that is slightly inclined relative to the plane formed by the x- and y-axes. Trough 102 accordingly has a top portion 104 and a bottom portion 106. The angle off horizontal may be, by way of non-limiting examples, less than any of 1°, 2°, 3°, 4° and 5°. In some embodiments, the angle is greater than or equal to 5° but less than 30°.

A cold atom cloud (hereinafter, "atoms") 108 is held by a MOT above trough 102. Atoms 108 may be, by way of non-limiting example, a Bose-Einstein condensate or any other type of cold atom cloud. When the atoms are released from the MOT, they drop under force of gravity within trough 102. Atoms 108 bounce back up as gravity causes them to strike an evanescent field (discussed further below) at the bottom of trough 102. Gravity then overcomes the force of the bounce and brings atoms 108 back down to trough 102, thus repeating the bouncing motion. Due to the incline, the motion of atoms 108 includes a component more-or-less parallel to an axis of trough 102. Thus, atoms 108 bounce down trough 102 generally in the direction of its axis. With each bounce, atoms 108 pick up more velocity, such that the landing points become further and further apart until the atoms reach the end of trough 102. The motion of atoms 108 is shown in FIG. 1 as a series of arcs 112 of expanding width. The evanescent field is configured (discussed more fully below) such that any energy loss from the bouncing of atoms 108 is de minimus. The peaks of the bounce therefore define a peak axis 110 which is substantially parallel to the axis of trough 102.

To obtain an acceleration measurement, certain properties of the atoms 108 are measured as they bounce down trough 102. To that end, a Raman beam is used to measure a differential momentum imparted to a portion of atoms 108 as described presently. A Raman beam is set to be collinear, or nearly so, with peak axis 110. The Raman beam is pulsed, by way of non-limiting example, three (3) times at equally-spaced time periods. The Raman pulses may be timed to correspond to when the atoms are at the top, or nearly at the top, of a bounce. This can be achieved because bounce trajectories are essentially repeatable. In general, the more time between the first and last pulse, the more accurate the reading. Thus the first pulse may be fired just as atoms 108 are released, and the last pulse fired when atoms 108 hit their last apex 114. When the number of bounces along trough 102 is an even number n (as configured in some embodiments), then the equitemporal middle pulse may overlap at the middle apex, that is, the first apex after the n/2 bounce. These three readings allow for generation of the phase measurement.

More particularly, the measurement of atoms 108 by way of Raman pulses may proceed as follows. A Raman beam with a Rabi frequency relative to quantum states denoted herein as $|\Phi_1\rangle$ and $|\psi_2\rangle$ may be used. Atoms 108 are initially placed in state $|\psi_1\rangle$. After they are released from the MOT, a π/2 Raman pulse places atoms 108 in a superposition of the two states $$\left(e.g., \frac{|\psi_1\rangle + |\psi_2\rangle}{\sqrt{2}}\right).$$

Next, after a first time interval T when the atoms are at or near the apex of a bounce, the Raman beam delivers a π-pulse to the atoms, which inverts the state of the atoms, i.e., changes atoms with state $|\psi_1\rangle$ to state $|\psi_2\rangle$ and vice-versa. (The time interval, T, is set to correspond to an integral number of bounces so as to ensure that the Raman pulses are applied when the atoms are nominally at the classical turning point of their upward trajectory.) After a second time interval T another π/2 Raman pulse is applied, which, in the absence of gravity, would convert each individual atom that is in state $|\psi_2\rangle$ to state $|\psi_1\rangle$. However, in the presence of gravity, at least a portion of atoms 108 receive added momentum and will remain in state $|\psi_2\rangle$ after the third Raman pulse. Thus, counting the relative portion of atoms that remain in state $|\psi_2\rangle$ will yield an acceleration measurement.

To measure the proportion of atoms 108 that remain in state $|\psi_2\rangle$, an embodiment of the present invention may direct a laser to atoms 108 that causes individual atoms in state $|\psi_2\rangle$ to fluoresce. (Alternately, the laser may cause individual atoms in state $|\psi_1\rangle$ to fluoresce.) This first fluorescence is measured, e.g., by a charge-coupled device, photomultiplier tube, or any other technique. A final Raman pulse directed to atoms 108 returns the individual atoms to the initial state $|\psi_1\rangle$. A laser pulse is then delivered to atoms 108 to cause all atoms in state $|\psi_1\rangle$ to fluoresce. This second fluorescence is then measured. The first fluorescence is compared to the second fluorescence, yielding a measurement of the proportion of atoms 108 that remained in state $|\psi_2\rangle$ after the third Raman pulse. This proportion is then used to derive the measured acceleration. Note that the process of releasing atoms 108 and measuring proportional fluorescence may be repeated multiple times in rapid succession.

The measured shift due to gravitational acceleration may be expressed as, by way of non-limiting example, $\Delta\Phi=k_R g_z T^2$, where $k_R$ represents the effective wavelength of the Raman beams and $g_z$ represents the vertical component of gravitational acceleration. Accordingly, the sensitivity to changes in $g_z$ scales with $T^2$. The gravity gradient may be determined as a difference between the gravity measurements made by two spatially separated interferometric accelerometer.

Figure 2:
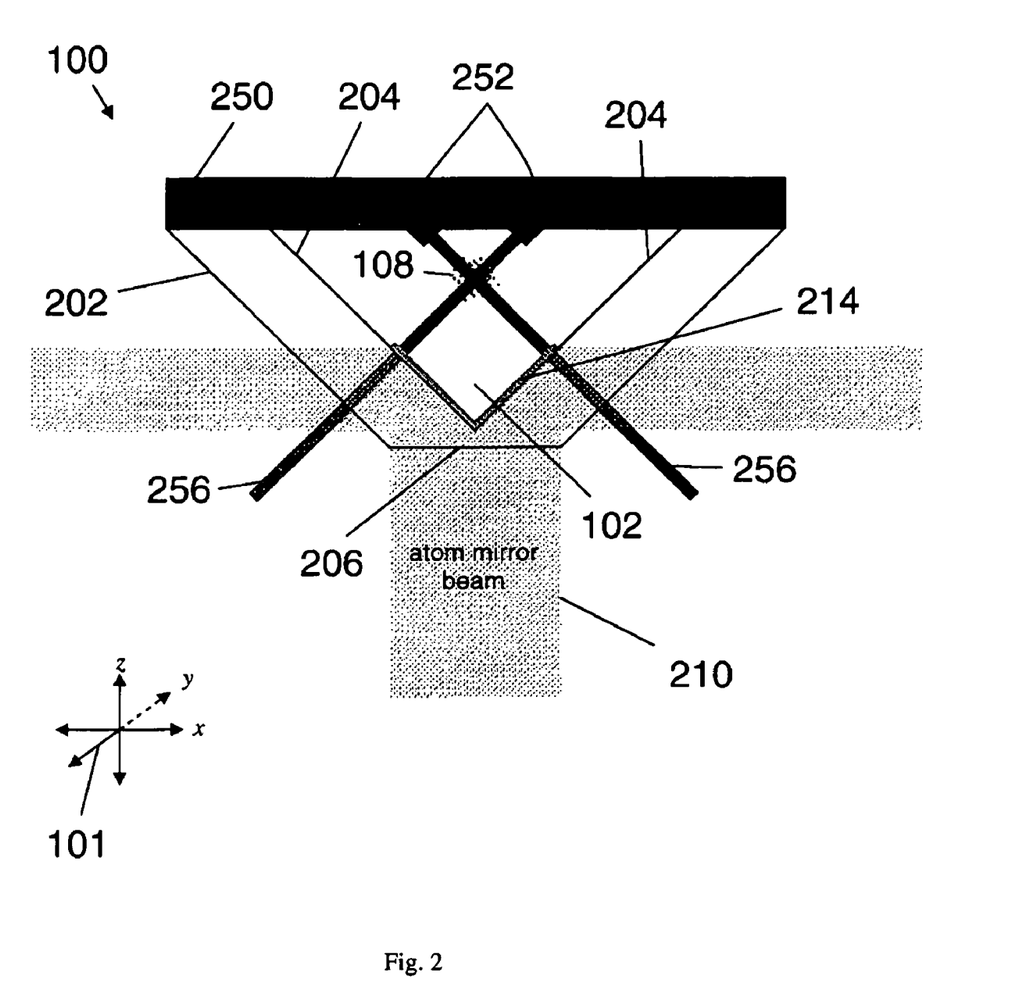
FIG. 2 is a schematic diagram of a cross-section of an interferometric accelerometer according to an embodiment of the present invention.

FIG. 2 is a schematic diagram of a cross section of an interferometric accelerometer according to an embodiment of the present invention. In particular, FIG. 2 shows a non-limiting example of a cross section of an interferometric accelerometer 100 in which an evanescent field is created. The cross section is taken perpendicular to the axis of the interferometric accelerometer, i.e., perpendicular to the direction of trough 102. An evanescent field 214 is established for atoms 108 to bounce on as they travel down trough 102. Trough 102 and evanescent field 214 form an atom-reflecting mirror as laser light is passed through a substantially V-shaped structure 202 of optically-transmissive material, such as glass. The shape of substantially V-shaped structure 202 is defined generally by an inner trough with two inner sides 204, with the outside bottom keel of the structure truncated. That is, substantially V-shaped structure 202 is frustum shaped. The outer surface of substantially V-shaped structure 202 thus has a flat base 206, while the inner sides 204 form a V-shaped trough 102.

Figure 4:
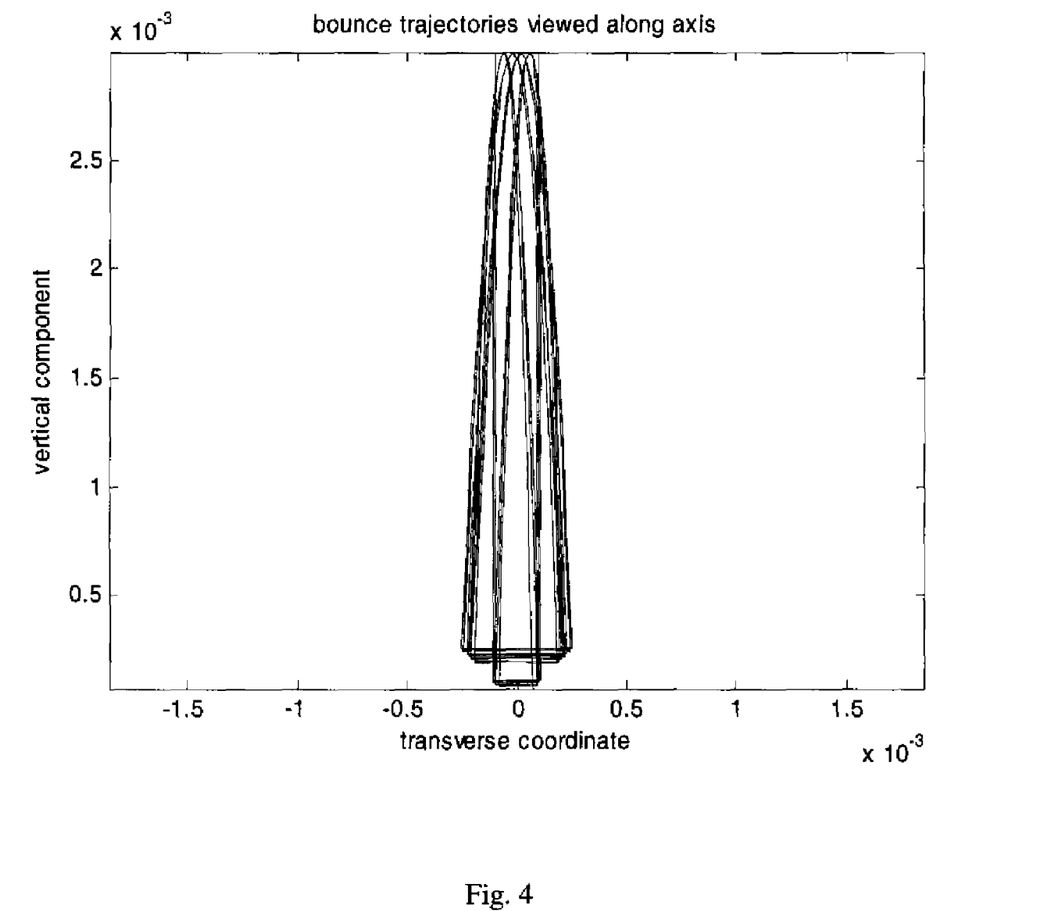
FIG. 4 depicts motion of a cold atom cloud according to an exemplary embodiment of the invention.

The angle of sides 204 and base 206 are preferably set such that a beam of light 210 projected normally (i.e., perpendicularly to) the base 206 enters through base 206 and impinges equally on interior surfaces of sides 204. The refractive index of the optical material and the interior angle of sides 204 are selected so that the beam 210 reflects substantially in its entirely off the interface between sides 204 and trough 102. Thus, beam 210 undergoes total internal reflectance. The reflectance of the beam 210 creates a V-shaped evanescent field 214 along the inner sides 204 of in the interior region of trough 102. Due to the shape of trough 102, evanescent field 214 in part defines a V-shaped atom mirror (Evanescent-Field Atom Mirror or "EFAM"), which confines the atoms 108 from below. In some embodiments, the outside of V-shaped structure 202 may be coated with an anti-reflective coating. As atoms 108 move into the plane defined by the face of FIG. 2 (i.e., at a slight angle to the y-axis 101) down trough 102, they may also have lateral motion as they bounce between both sides of the V-shaped mirror. A non-limiting example of the pathway taken by atoms 108 is shown in FIG. 4.

Because the EFAM is formed in part from coherent light, non-uniformity in the field (due to interference effects or speckle) may result in dipole forces in undesirable directions. To mitigate speckle, the laser may be frequency modulated (e.g., using an acoustic-optic modulator) at a rate much faster than the atom-field interaction time. Modulation of the laser may cause the speckle pattern to change rapidly. The atoms then respond to the time average intensity, which may be more uniform than a single speckle pattern.

Atoms 108 can be generated by a variety of methods. A non-limiting method is to provide a Bose Einstein Condensate ("BEC") chip 250 with the appropriate geometry to allow three intersecting MOT beams to create an area that can hold condensate atoms as they collect to form atoms 108. Such chips may be fabricated with small wires patterned on the surface in such a way as to produce magnetic fields when energized. Used in conjunction with MOT laser beams, these fields produce a mirror MOT just below the bottom surface of the chip 250. Atoms are trapped in the MOT and then can be evaporatively cooled using RF fields until the BEC forms. The BEC is formed close to the surface but can then be lowered deeper into the trough before being released.

BEC chip 250 supports two angled mirrors 252 on the inner surfaces near top point 104. Two MOT beams 256 are directed toward the mirrors 254 on complimentary angles. These two beams 256 intersect with the remaining MOT beam (along the axis of the trough) to form an overlap zone, which supports the formation of atoms 108. The angles of the beams 256, the mirrors 252 and sides 204 may be set so that the reflected portions of MOT beams 256 remain collinear with the incoming MOT beams 256. The Raman beam that is collinear with peak axis 110 of FIG. 2 may be parallel to, but lower than, the axial MOT beam. In some embodiments, the Raman beam may be collinear with the axial MOT beam.

Atoms 108 repeatedly bounce off evanescent field 214 as they accelerate generally parallel to the axis of trough 102. By nature of the V-shape of evanescent field 214, atoms 108 can only accelerate freely in the direction of the trough axis, defined by the intersection of the two inner sides 204. Acceleration in either of the directions perpendicular to this axis is interrupted by the evanescent field 214.

Figure 3:
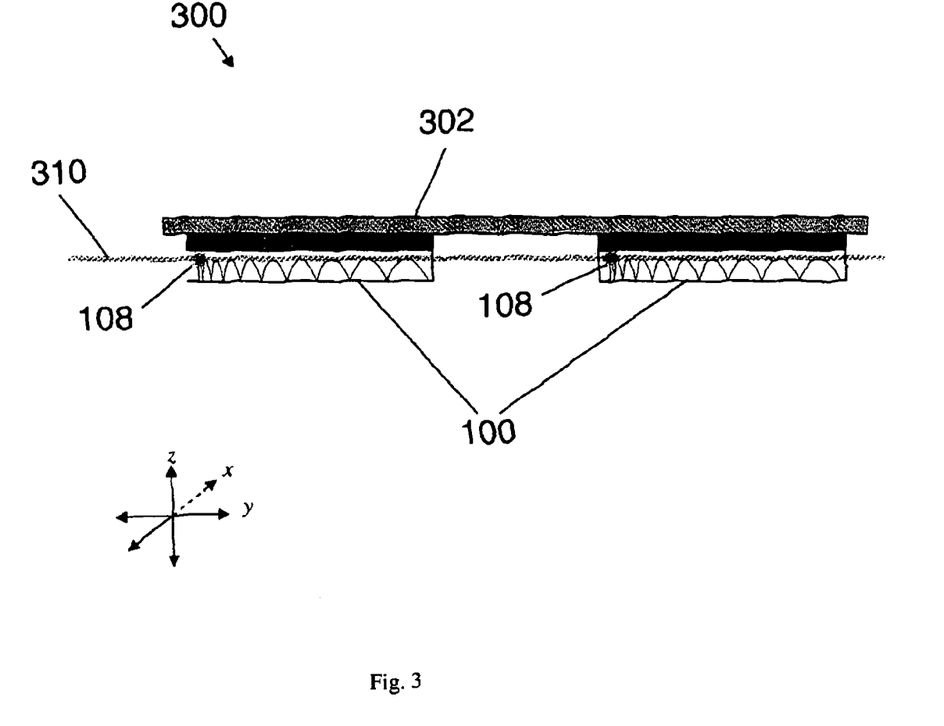
FIG. 3 is a schematic diagram of a gravitational gradiometer according to an embodiment of the present invention.

FIG. 3 is a schematic diagram of a gravity gradiometer according to an embodiment of the present invention. The embodiment includes two individual interferometric accelerometers 100 supported by a frame 302 and aligned with the pathway of a common Raman beam 310. Atoms 108 are dropped into each interferometric accelerometer 100, and acceleration measurements may be collected using a Raman beam as discussed above in reference to FIG. 1. Using known techniques, differences between the acceleration measurements made by each interferometric accelerometer 100 may then be used to calculate a gravimetric gradient measurement.

Frame 302 for the gravity gradiometer maintains both interferometric accelerometers 100 in a consistent orientation and spacing. A distance between interferometric accelerometers 100 may be on the order of 20 cm. Other suitable separation distances include, by way of non-limiting example, 10 cm, 30 cm, 40 cm, 50 cm, 60 cm, 70 cm, 80 cm, 90 cm, 1 m, 1.5 m, 2 m and 3 m. Flexure of frame 302 may result in each interferometric accelerometer measuring a slightly different component of the gravitational field, yielding inaccurate results. Fortunately, the small size of the interferometric accelerometers 100 makes structural rigidity relatively easy to obtain. Non-limiting examples of frame 302 materials include carbon fiber composites, metals, plastics and ceramics. Suitable materials may have near zero (e.g., less than 1, less than 0.5, less than 0.25 or less than 0.1) thermal expansion coefficients, either linear or volumetric.

Embodiments of the present invention (e.g., 300) that include multiple interferometric accelerometers 100 may further include sensors that detect small relative changes in position. For example, embodiments that include multiple interferometric accelerometers, such as the embodiment depicted in FIG. 3, may further include an interferometer that detects small changes in relative position of the interferometric accelerometers. Such embodiments may include logic that adjusts the calculations on data received from the interferometric accelerometers to account for such changes and produce accurate gravity gradient readings.

FIG. 4 depicts a model of motion of atoms according to an exemplary embodiment of the invention. In the V-shaped trough geometry, a classical particle dropped from some height above the bottom of the trough and offset slightly from the trough axis would fall until it reflected off one of the atomic mirrors. (The motion of a classical particle sufficiently approximates that of the center of mass of a cold atom cloud for the purposes of FIG. 4.) Since gravity continues to accelerate the particle downward as it traverses the distance between the two mirrors, it strikes the second mirror with a small vertical component, which alters the angle of the second reflection. Whereas an optical trough-mirror retro-reflects light that arrives perpendicular to the trough axis, this is not the case for particles with mass in a gravitational field. By adjusting the angle between the two inner sides (204 of FIG. 2), the bounce trajectories may be altered. FIG. 4 is a depiction of modeled classical trajectories for atoms dropped 3 mm above the trough with a lateral offset of 100 μm. The trough considered in FIG. 4 is inclined 1° from the horizontal ($\theta=89°$), and the angle between the two inner sides is 89.80°. The component of the gravitational acceleration in axial direction is then 17.12 cm/s$^2$, which corresponds to the acceleration observed in FIG. 4.

Regarding energy quantization, note that the confinement of the atom in the direction orthogonal to the trough axis results in quantization of the energy corresponding to motion in these directions. For mirrors at 90° to each other, the equations of motion are separable, resulting in independent quantization in each of the directions defined by the mirror normals. For non-orthogonal mirrors, the basis functions are more complicated, but the confinement provided by gravity is weak, and the energy levels are very close together. Because of the closely space energy levels, the classical trajectories are good approximations to the fully quantum behavior.

As discussed herein, the accuracy of a gravity gradiometer may be affected by the length of time between the first and last Raman pulse. In comparison to certain embodiments of the present invention, vertical gravity gradiometers of the prior art require that atoms travel over considerably longer vertical distances to achieve the same integration time. In the embodiments discussed herein, the effect of gravity acceleration is limited by the angle of the pathway (e.g., trough 102 of FIG. 1) off the horizontal. By way of example, a gravity gradiometer with a 2° angle off the horizontal is approximately thirty (30) times more sensitive then a vertical gravity gradiometer of the same length. Put another way, a gravity gradiometer according to an embodiment of the present invention provides the same sensitivity as a vertical gravity gradiometer some thirty (30) times its size. In practical terms, the sensitivity of a prior art ten-foot vertical gravity gradiometer could be achieved with a gravity gradiometer as long as a human finger.

Certain embodiments provide multiple improvements over the prior art. The most obvious improvements lie in reduced size and weight, and corresponding reduction in expenses for design, construction, transport and deployment. Gravity gradiometer 100 could also be mounted on small vehicles that cannot contain prior art gravity gradiometers, such as unmanned aerial reconnaissance vehicles.

The substantially horizontal nature of gravity gradiometers according to certain embodiments also provides additional advantages beyond mere size improvements. Cargo space in aircraft tend to be longer then they are tall, such that embodiments according to the present disclosure may be easier for aircraft to accommodate. A horizontal environment is also less sensitive to acceleration in the direction of travel, whereas a vertical gravity gradiometer of the prior art would more easily lose containment of the atoms within the Raman beam(s), thus destroying the measurement. In contrast, atoms 108 in gravity gradiometer 100 would simply shift along the axis of trough 102 without losing containment (absent the shift being sufficient to displace the atoms 108 off the ends of the trough 102). In certain embodiments of the present invention, common mode acceleration will cancel out when occurring in both accelerometers. In some embodiments, if standard accelerometers detect acceleration over a set threshold, the measurements from the interferometric accelerometers are discarded and the measurements repeated.

The above physical construction and operation of interferometric accelerometer 200 and gravity gradiometer 300 may be further be understood with respect to various discussions of the controlling physics. The time it takes to accelerate an object a distance in a constrained geometry may be represented as, by way of non-limiting example:

$$T = \sqrt{\frac{2d}{g\cos(\theta)}}. \tag{1}$$

In Equation 1, d represents the distance accelerated, $\theta$ represents the angle between the gravity vector and the direction of unconstrained motion, and g represents acceleration due to gravity. As $\cos(\theta)$ gets small, the integration time, and hence the accuracy of a gravity gradiometer, increases. Thus, where d represents the length of path 102, for example, T represents integration time.

The sensitivity for a gravity gradiometer, constructed so that the atoms, instead of being launched vertically, are released into a trap where free acceleration is permitted only in a direction that is nearly orthogonal to the vertical, may be represented as, by way of non-limiting example:

$$\sigma_\Gamma = \frac{2\sigma_\phi}{k_R L T^2} = \frac{\sigma_\phi g \cos(\theta)}{k_R L d}. \tag{2}$$

In Equation 2, $\sigma_\phi$ represents sensitivity, $\sigma_\phi$ represents uncertainty in phase measurement, $k_R$ represents the effective wavelength of the Raman beams, L represents the spatial separation between interferometric accelerometer (e.g. 100 as appearing in FIG. 3), and the remaining symbols are as defined above in relation to Equation 1. Note that the sensitivity of the gradiometer scales linearly with the baseline separation d and quadratically with integration time T. Thus, the sensitivity is a factor of $1/(2\cos\theta)$ better than for a vertical gravity gradiometer. The factor of two (2) is due to the fact that the atoms are launched upward in the prior art vertical geometry, but not in the inclined geometry.

Regarding dipole forces, reflection of the atoms from the EFAM is based on the dipole force experienced by the atoms in proximity to the vacuum-dielectric interface. This force may be represented as, by way of non-limiting example:

$$F(z) = \frac{\eta\delta}{\kappa}\left(\frac{s}{1+s}\right). \tag{3}$$

In Equation 3, F represents the force, $\hbar$ represents Planck's constant, z represents the distance from the interface, $\delta$ represents the detuning between the field and the atomic transition frequency, $\kappa$ represents the characteristic decay length of the evanescent field (determined by the angle of incidence and the index of refraction), and s represents a saturation parameter. The saturation parameter may be represented as, by way of non-limiting example:

$$s = \frac{1}{2}\left(\frac{\Omega^2(z)}{\delta^2 + (\Gamma/2)^2}\right). \tag{4}$$

In Equation 4, $\Omega(z)$ represents the Rabi frequency, $\Gamma$ represents the linewidth of the transition and the remaining parameters are as defined above.

In the limit of large detuning and low saturation, the height of the potential barrier due to the evanescent field may be represented as, by way of non-limiting example:

$$U_0 = \frac{\eta\Omega^2(0)}{4\delta}. \tag{5}$$

The parameters of Equation 5 are as defined above. This potential is sufficient to reflect atoms of mass, m, dropped from a height of $z_{max}$, where $z_{max}$ may be represented as, by way of non-limiting example:

$$z_{max} \leq \frac{\eta\Omega^2(0)}{4\delta mg}. \tag{6}$$

In Equation 6, the parameters are as defined above, and m represents the mass of the atoms.

Regarding scattering, the average number of scattering events during a reflection may be represented as, by way of non-limiting example:

$$n = \frac{\Gamma m v \kappa}{\eta\delta}. \tag{7}$$

In Equation 7, the parameters are as defined above, except that v represents the velocity of the atoms. To minimize heating effects due to absorption and spontaneous emission, this number is preferably much less than one per bounce. The velocity an initially at-rest atom acquires as it falls a distance z may be represented as, by way of non-limiting example:

$$v = \sqrt{2gz}. \tag{8}$$

Solving for the detuning, yields, by way of non-limiting example:

$$\delta = \frac{\Gamma m \kappa \sqrt{2gz}}{\eta n}. \tag{9}$$

Equation 9 implies a Rabi frequency at the surface as represented by way of non-limiting example as:

$$\Omega(0) > \frac{2m}{\eta}(gz)^{\frac{3}{4}}\sqrt{\frac{\sqrt{2}\,\Gamma\kappa}{n}}. \quad (10)$$

The parameters appearing in Equation 10 are as defined above.

Various alternatives may be used to establish or replace the trough atomic mirror portion of each interferometric accelerometer. By way of non-limiting example, two planar waveguides arranged in "V" shape could be used. In another alternative, a hollow fiber with blue detuned light propagating in the fiber may be used; the evanescent field in the center of the fiber would confine the atoms in all directions perpendicular to the axis of the fiber (which may be the axis of the atom interferometer) while the Raman beams may be directed down the center of the fiber. Still another option is to use a hollow laser beam; there is no evanescent field, but the intensity of the beam falls off towards the center to create a confining dipole potential. In general, any dark optical trap may be used. As used herein, the term "cold atom cloud containment vessel" means any technique or device that is capable of retaining a cold atom cloud for a period of time sufficient to perform the measurements described herein. The structures of FIG. 2 and the structures described in this paragraph are non-limiting examples of cold atom cloud containment vessels.

Acceleration of the platform carrying the gravity gradiometer may affect each interferometric accelerometer. If the vertical component of such acceleration is significant (e.g., in a maneuvering airplane), it may change the timing of the bounces, which may necessitate adjustments to the timing of the Raman pulses. If the acceleration in the direction of the interferometer axis is significant, then the integration time may be reduced so that the atoms remain within the length of mirrors. Transverse accelerations may affect the bouncing trajectories and could result in loss of confinement. Accelerations in this direction may be controlled to within some limit in order to maintain good results from the gradiometer. Some embodiments include on-board conventional accelerometers in order to detect platform accelerations and provide estimates for interferometer control software. Based on the conventional accelerometer inputs, the timing of the Raman pulses can be adjusted as needed. That is, a standard accelerometer may be used to gain a rough measure of absolute acceleration, and the timing of the Raman pulses may be adjusted accordingly. Suitable standard accelerometers include any non-quantum accelerometers, such as an ADXL325, ADXL326, ADXL327 or ADXL330 available from Analogue Devices of Norwood, Mass.

Platform rotations may contribute to different accelerations in each interferometric accelerometer. Some embodiments may include conventional accelerometers to detect such rotations. Alternately, or in addition, certain embodiments may include standard inertial navigation systems to detect rotation. Rotations may be controlled, e.g. by use of gimbals, to within some tolerable range. Such systems may be used to, e.g., active gimballing. Since some gravity gradiometer embodiments use common Raman pulses for each interferometric accelerometer pair, differences in acceleration may be accounted for by different timing adjustments.

Certain embodiments of the present invention provide gravity gradiometers in a more compact form than the prior art. Some embodiments provide a gravity gradiometer whose height (i.e., vertical dimension, excluding computer hardware) does not exceed one meter. Some embodiments provide a gravity gradiometer whose height does not exceed 50 centimeters.

Embodiments of the present invention may include various outputs, which output signals representing detected gravitational acceleration or gravity gradients. Such outputs may be configured to present the signals in a human-readable form, such as a computer monitor. Alternately, or in addition, the outputs may be configured to provide information to other devices or modules within the same device.

The particular optical manipulation devices depicted herein are illustrative and representative and not meant to be limiting. By way of non-limiting example, mirrors and particular lasers disclosed herein may be replaced with devices known to those of ordinary skill in the art.

For the embodiments described herein, portions of one embodiment may be substituted, replaced, or inserted into other embodiments. That is, the teachings disclosed herein should be viewed collectively, with each embodiment capable of employing technologies drawn from other embodiments.

Certain quantities described herein are probabilistic. Thus, such quantities must be viewed as being typical, yet subject to variation. Further, most of the observations and measurements discussed herein are subject to noise of various forms from various sources. Probabilistic quantities are typically subjected to statistical analysis, known in the art, to ascertain their reliability and assist in drawing conclusions.

The equations contained in this disclosure are illustrative and representative and are not meant to be limiting. Alternate equations may be used to represent the same phenomena described by any given equation disclosed herein. In particular, the equations disclosed herein may be modified by adding error-correction terms, higher-order terms, or otherwise accounting for inaccuracies, using different names for constants or variables, or using different expressions. Other modifications, substitutions, replacements, or alterations of the equations may be performed.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A system for measuring a gravitational acceleration, the system comprising:
    a trough constructed of an optically transmissive material, the trough comprising an axis, an inner surface and an outer surface, the inner surface having a V-shaped cross-section, the outer surface having a flat bottom portion, the trough configured to be positioned such that an angle between the axis and a horizontal plane is less than five degrees, thereby defining an inclined trough with an upper trough portion and a lower trough portion;

a source of coherent light configured to direct coherent light to the flat bottom portion and thereby generate an evanescent field about the inner surface;

a source of cold atom clouds configured release cold atom clouds at the upper trough portion;

a Raman beam source configured to impart at least two quantum states on atom clouds within the trough;

a sensor configured to measure a proportion of quantum states of atoms in cold atom clouds within the trough;

a processor configured to receive a first signal reflecting the proportion and generate a second signal representing the gravitational acceleration; and an output for outputting data reflecting the gravitational acceleration.

2. The system of claim 1, wherein the source of cold atom clouds comprises a source of Bose-Einstein condensates.

3. The system of claim 1, wherein the source of cold atom clouds comprises a magneto-optical trap.

4. The system of claim 1 further comprising another system for measuring gravitational acceleration, wherein the systems for measuring gravitational acceleration are spatially separated and configured to provide information regarding gravitational acceleration at their respective locations to a processor, wherein the processor is configured to calculate gravity gradient information from the information regarding gravitational acceleration and output the gravity gradient information.

5. The system of claim 1, wherein the angle between the axis and the horizontal plane is less than three degrees.

6. The system of claim 1, wherein the angle between the axis and the horizontal plane is less than two degrees.

7. The system of claim 1, wherein a height of the system does not exceed one meter.

8. The system of claim 1, wherein the output comprises a display configured to display the gravitational acceleration in a human interpretable format.

9. A system for measuring gravitational acceleration, the system comprising:

a cold atom cloud containment vessel defining an axis, the cold atom cloud containment vessel configured to be positioned such that an angle between the axis and a horizontal plane is less than five degrees, thereby defining an inclined cold atom cloud containment vessel with an upper portion of the inclined cold atom cloud containment vessel and a lower portion of the inclined cold atom cloud containment vessel;

a source of cold atom clouds configured to release cold atom clouds at the upper portion of the inclined cold atom cloud containment vessel;

a sensor configured to measure a proportion of cold atom cloud atoms in a predetermined quantum state;

a processor configured to receive a first signal reflecting the proportion and generate a second signal representing gravitational acceleration at a location of the system; and an output for outputting the second signal.

10. The system of claim 9, wherein the source of cold atom clouds comprises a source of Bose-Einstein condensates.

11. The system of claim 9, wherein the source of cold atom clouds comprises a magneto-optical trap.

12. The system of claim 9, further comprising another system for measuring gravitational acceleration, wherein the systems for measuring gravitational acceleration are spatially separated and configured to provide information regarding gravitational acceleration at their respective locations to a processor, wherein the processor is configured to calculate gravity gradient information from the information regarding gravitational acceleration and output the gravity gradient information.

13. The system of claim 9, wherein the angle between the axis and a horizontal plane is less than three degrees.

14. The system of claim 9, wherein the angle between the axis and a horizontal plane is less than two degrees.

15. The system of claim 9, wherein the output comprises a display configured to display the gravitational acceleration in a human interpretable format.

16. A system for measuring a gravity gradient, the system comprising:

a first cold atom cloud containment vessel defining a first axis, the first cold atom cloud containment vessel configured to be positioned such that a first angle between the first axis and a horizontal plane is less than five degrees, thereby defining an upper portion of the first cold atom cloud containment vessel and a lower portion of the first cold atom cloud containment vessel;

a first source of cold atom clouds configured to release a first plurality of cold atom clouds at the upper portion of the first cold atom cloud containment vessel;

a second cold atom cloud containment vessel defining a second axis, the second cold atom cloud containment vessel configured to be positioned such that a second angle between the second axis and the horizontal plane is less than five degrees, thereby defining an upper portion of the second cold atom cloud containment vessel and a lower portion of the second cold atom cloud containment vessel;

a second source of cold atom clouds configured to release a second plurality of cold atom clouds at the upper portion of the second cold atom cloud containment vessel;

a processor configured to receive first information regarding a proportion of atoms in each cold atom cloud in the first plurality of cold atom clouds in a predetermined quantum state and second information regarding a proportion of atoms in each cold atom cloud in the second plurality of cold atom clouds in a predetermined quantum state, the processor further configured to generate a signal representing a gravity gradient between a location of the first cold atom cloud containment vessel and a location of the second cold atom cloud containment vessel based on the first information and the second information; and an output for outputting the signal.

17. The system of claim 16, wherein the first source of cold atom clouds comprises a first source of Bose-Einstein condensates and the second source of cold atom clouds comprises a second source of Bose-Einstein condensates.

18. The system of claim 16, wherein the first source of cold atom clouds comprises a first magneto-optical trap and the second source of cold atom clouds comprises a second magneto-optical trap.

19. The system of claim 16, wherein the first angle is less than three degrees and the second angle is less than three degrees.

20. The system of claim 16, wherein the first angle is less than two degrees and wherein the second angle is less than two degrees.

21. The system of claim 16, wherein the output comprises a display configured to display the gravity gradient in a human interpretable format.

* * * * *